(12) United States Patent
Cruickshank, III et al.

(10) Patent No.: US 12,367,437 B1
(45) Date of Patent: *Jul. 22, 2025

(54) TASK-SPECIFIC GPS-ENABLED NETWORK FAULT ANNUNCIATOR

(71) Applicant: CSC Holdings, LLC, Bethpage, NY (US)

(72) Inventors: Robert Cruickshank, III, Big Indian, NY (US); Lou Riley, Smithtown, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,544

(22) Filed: May 22, 2023

Related U.S. Application Data (63) Continuation of application No. 17/073,849, filed on Oct. 19, 2020, now Pat. No. 11,694,133, which is a continuation of application No. 14/918,768, filed on Oct. 21, 2015, now Pat. No. 10,810,525.

(60) Provisional application No. 62/158,360, filed on May 7, 2015.

(51) Int. Cl.
G06Q 10/06 (2023.01)
G06Q 10/0631 (2023.01)

(52) U.S. Cl.
CPC .............................. G06Q 10/063116 (2013.01)

(58) Field of Classification Search
CPC ...................................................... G06Q 10/06
See application file for complete search history.

(56) References Cited

U.S. PATENT DOCUMENTS

| | | | |
|---|---|---|---|
| 6,320,812 B1 | 11/2001 | Cook et al. | |
| 7,142,874 B1 * | 11/2006 | Oleniczak | H04B 17/309 455/456.2 |
| 7,516,025 B1 | 4/2009 | Williams et al. | |
| 7,617,248 B2 * | 11/2009 | Ditcharo | G06Q 10/063112 707/999.102 |

(Continued)

FOREIGN PATENT DOCUMENTS

GB 2457320 A * 8/2009 ............. G06Q 10/06

OTHER PUBLICATIONS

StrataSync™, Digital Services Activation Meter (DSAM), JDS Uniphase Corporation Product, 10143252 513 0614 DSAMFAM. BR.CAB.NSE.AE Jun. 2014. (Year: 2014).*

(Continued)

*Primary Examiner* — Kurtis Gills
(74) *Attorney, Agent, or Firm* — Lowenstein Sandler LLP (57) ABSTRACT

Embodiments include a system, method, and a computer program product for notifying a technician when a repair task the technician is addressing may be negatively impacted by a nearby fault and/or if the technician is qualified to repair a nearby fault. The technician is qualified if the technician has the necessary skills, parts (e.g., materials), and/or equipment (test equipment) required to repair the nearby fault. In addition, embodiments include receiving and responding to queries from a technician to: determine whether any of the repair tasks associated with the technician's assigned tickets are futile tasks based on newly received faults or pending tickets; and determine whether the querying technician is qualified to address (e.g., repair) any newly received faults or pending tickets.

20 Claims, 7 Drawing Sheets

(56) References Cited

U.S. PATENT DOCUMENTS

| | | |
|---|---|---|
| 7,796,500 B1 | 9/2010 | Elliott et al. |
| 9,009,542 B1 | 4/2015 | Marr et al. |
| 9,780,836 B2 | 10/2017 | Varma et al. |
| 9,960,951 B1 | 5/2018 | Cruickshank et al. |
| 10,298,441 B1 | 5/2019 | Cruickshank et al. |
| 10,708,119 B1 | 7/2020 | Cruickshank, III et al. |
| 10,810,525 B1 | 10/2020 | Cruickshank, III et al. |
| 2002/0194319 A1* | 12/2002 | Ritche ............ H04L 41/0677 709/224 |
| 2004/0111197 A1 | 6/2004 | Kipersztok et al. |
| 2005/0246612 A1 | 11/2005 | Leis et al. |
| 2006/0146820 A1 | 7/2006 | Friedman et al. |
| 2007/0130179 A1* | 6/2007 | Gilson ................ G06F 30/30 |
| 2008/0010661 A1 | 1/2008 | Kappler et al. |
| 2009/0322522 A1 | 12/2009 | Meunier |
| 2010/0153165 A1* | 6/2010 | Kosseifi ............ G06Q 10/087 701/465 |
| 2010/0205032 A1* | 8/2010 | Nielsen ............ G06Q 10/06 715/702 |
| 2011/0231704 A1* | 9/2011 | Ge .................. G06F 11/079 714/E11.029 |
| 2013/0004179 A1 | 1/2013 | Nielsen et al. |
| 2013/0053023 A1 | 2/2013 | Meredith et al. |
| 2013/0064279 A1* | 3/2013 | Nielsen ............ H04J 3/1694 375/227 |
| 2013/0103841 A1 | 4/2013 | Werth et al. |
| 2013/0114625 A1 | 5/2013 | Cunningham |
| 2013/0183030 A1* | 7/2013 | Duis ................ H04B 10/071 156/154 |
| 2014/0003478 A1* | 1/2014 | Liu .................. H04B 3/46 375/224 |
| 2014/0089208 A1 | 3/2014 | Humble et al. |
| 2014/0189086 A1 | 7/2014 | Chattopadhyay et al. |
| 2014/0244328 A1* | 8/2014 | Zhou ............ G06Q 10/06311 705/7.13 |
| 2014/0278652 A1* | 9/2014 | Joyner ......... G06Q 10/063116 705/7.16 |
| 2014/0288992 A1* | 9/2014 | Wetzer ............... G06Q 10/08 705/7.23 |
| 2015/0181442 A1* | 6/2015 | Zinevich ........... H04B 17/318 455/424 |
| 2015/0334225 A1 | 11/2015 | Bull et al. |

OTHER PUBLICATIONS

"The Need for DOCSIS™ Network Management," Stargus, Inc. Andover, Massachusetts, 2001; 13 pages.

Cruickshank III, R.F., et al., "Listen to the Network: Using DOCSIS to Manage DOCSIS Networks," Mar. 23, 2004; 10 pages.

Gordish, M., et al., "House Check—A lifecycle Approach to Monitoring Voice, Video & Data," Society of Cable Telecommunications Engineers (SCTE) Tee Expo, Jun. 2007; 12 pages.

Gordish, M., et al., "House Check—A New Process to Verify Voice Installs," 2007; 6 pages.

Home Integrity Score Field Operations Manual, Comcast Corporation; 8 pages.

U.S. Appl. No. 14/589,706 to Cruickshank, et al., "System and Method for Proactive Customer Access Network Maintenance", filed on Jan. 5, 2015.

U.S. Appl. No. 17/073,849 to Cruickshank, et al., "Task-Specific GPS-Enabled Network Fault Annunciator", filed on Oct. 19, 2020.

* cited by examiner

TASK-SPECIFIC GPS-ENABLED NETWORK FAULT ANNUNCIATOR

CROSS-REFERENCE TO RELATED APPLICATIONS

This application is a continuation application of U.S. Nonprovisional patent application Ser. No. 17/073,849, filed Oct. 19, 2020, entitled, "Task-Specific GPS-Enabled Network Fault Annunciator", which is a continuation application of U.S. Nonprovisional patent application Ser. No. 14/918,768, filed on Oct. 21, 2015, entitled, System and Method for Task-Specific GPS-Enabled Network Fault Annunciator, which claims the benefit of U.S. Provisional Application No. 62/158,360, System and Method for Task-Specific GPS-Enabled Network Fault Annunciator, filed May 7, 2015, all of which are incorporated herein by reference in their entireties.

BACKGROUND

Field

Embodiments generally relate to cable networks and more specifically to managing problems in a customer access network or outside plant of a cable system.

Background Art

Cable systems detect and manage failures in cable networks. When a problem occurs, there is a delay between the time the problem is detected, entered into a cable management system (e.g., to generate a repair ticket), assigned to a technician, and then addressed by the technician. A technician may be unaware of issues that may prevent him/her from completing an assigned task. Further, the technician may also be unaware of nearby faults that he/she may be able to assist in resolving.

DETAILED DESCRIPTION OF EMBODIMENTS

Embodiments take advantage of computing devices used by technicians and cable management systems to reduce repair times in a cable network. For example, by identifying and postponing futile work efforts, time, labor, materials and access to equipment may be reduced resulting in economic savings. In addition, embodiments take advantage of technician resources already present in the field to address new problems and/or pending tickets resulting in reduced repair times in the cable network.

Embodiments include notifying a technician when a repair task the technician is addressing may be negatively impacted by a nearby fault and/or if the technician is qualified to repair a nearby fault. The technician is qualified if the technician has the necessary skills, parts (e.g., materials), and/or equipment (test equipment) required to repair the nearby fault. In addition, embodiments include receiving and responding to queries from a technician to: determine whether any of the repair tasks associated with the technician's assigned tickets are futile tasks based on newly received faults; and determine whether the querying technician is qualified to address (e.g., repair) any newly received faults.

Embodiments include a system, method, and a computer program product for electronically obtaining first fault information from at least one of: a cable management system located at a cable headend or a computing device associated with a first technician, determining first fault location data associated with the first fault information, and correlating the first fault location data to a map. Embodiments further include analyzing the first fault information and the first fault location data with other fault information and other fault location data to determine any futile tasks.

When a repair task associated with the first fault information is a futile task, embodiments include electronically transmitting a notification to a respective ticketing system of the first fault information to postpone a ticket associated with the first fault information. When a pending ticket includes a futile task due to the first fault information, embodiments include electronically transmitting a notification to a respective ticketing system to postpone the pending ticket. When an assigned ticket includes a futile task due to the first fault information, embodiments include electronically transmitting a notification to a second technician to postpone efforts on the assigned ticket, and electronically transmitting a notification to a respective ticketing system to postpone the assigned ticket.

In addition, when a third technician in a geographic region of the first fault information is qualified to complete the repair task, embodiments include electronically transmitting a notification to the third technician to complete the repair task, and electronically transmitting a notification to the respective ticketing system of the first fault information that the repair task is being addressed. When the third technician in the geographic region is qualified to complete a second pending ticket in the geographic region, embodiments further include electronically transmitting a notification to the third technician to complete the second pending ticket, and electronically transmitting a notification to a respective ticketing system of the second pending ticket that the second pending ticket is being addressed.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
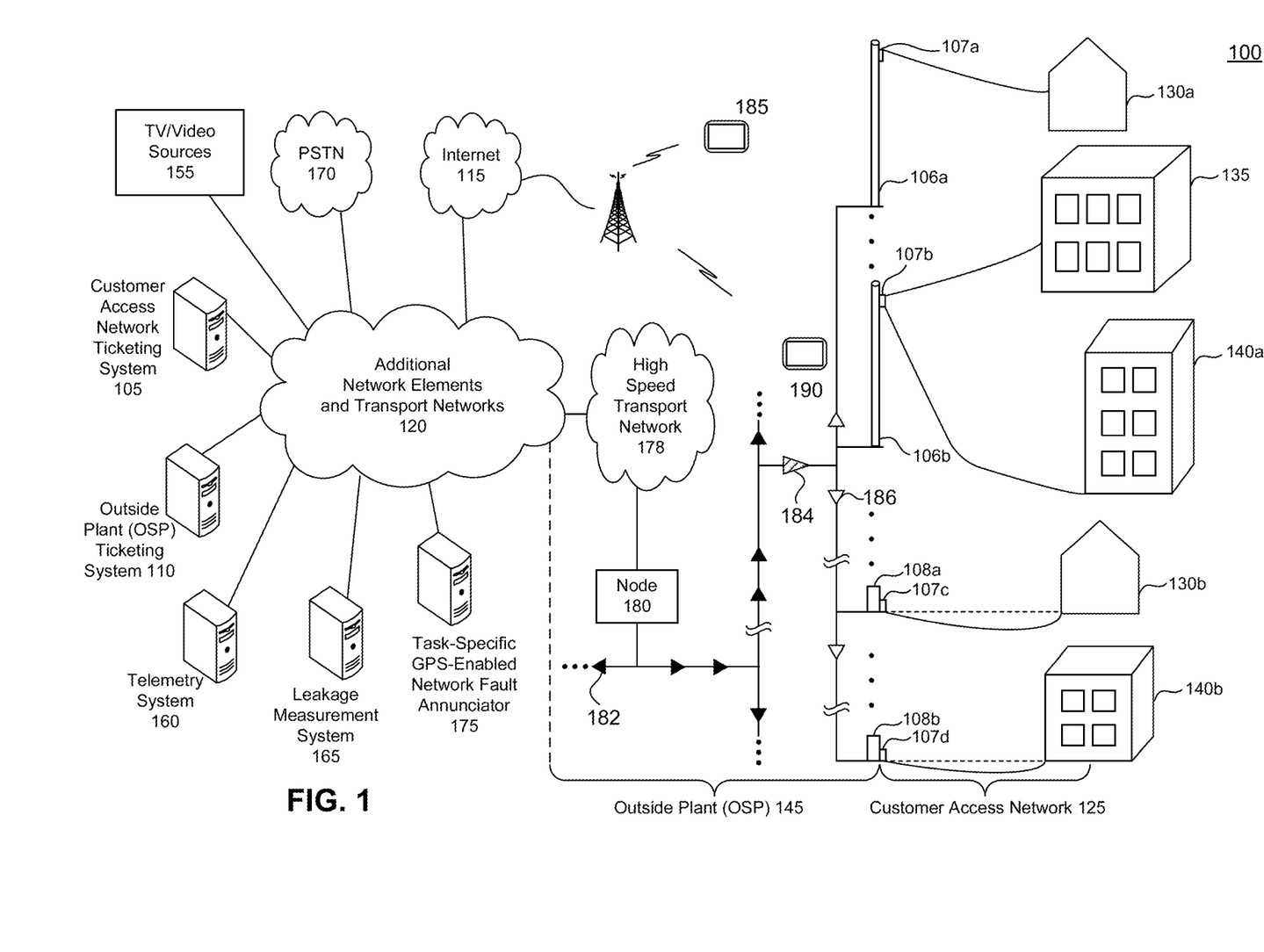
FIG. 1 illustrates an example system according to an embodiment.

FIG. 1 illustrates an example system 100 according to an embodiment. System 100 such as a cable system includes a cable headend, an outside plant (OSP) 145 and a customer access network 125. The headend includes a variety of network elements and transport networks that together support a range of services including but not limited to television and video services, Internet access, and Voice over Internet Protocol (VoIP) services. For example, a television program may be broadcast from TV/Video sources 155 through additional network elements and transport networks 120 to outside plant 145, and customer access network 125 to deliver the program to a customer in house 130a. One or more devices associated with a customer account (e.g., one or more devices in house 130a) may communicate with a service operator network via a customer access network 125 and outside plant 145 (e.g., communication may be bidirectional).

Outside plant (OSP) 145 (e.g., a trunk system and a distribution system) may include but is not limited to high speed transport network 178, a high-speed two-directional transport network such as a hybrid fibre-coaxial (HFC) network that includes optical fiber and/or coaxial cable, node 180, trunk lines coupled to trunk amplifiers 182, bridge amplifier 184 that couples a trunk line to a branch line, line extender amplifiers 186, cable poles 106, a pole-to-pole connection, pedestals 108, a repeater, an optical line terminal, or a passive optical network (not shown). Node 180 may convert optical signals to electrical signals sent over the one or more customer access networks 125 and may convert electrical signals from customer access networks 125 to optical signals that are sent over high speed transport network 178 to additional network elements and transport networks 120. While FIG. 1 shows some network elements, the service operator network may include one or more of the same types or different types of network elements (e.g., a cable modem termination system (CMTS)).

Although system 100 includes five customer access networks 125, each of which is associated with a customer account, there could be many more than five customer access networks. A customer access network 125 includes a drop network and customer wiring where a drop network may include an aerial connection or an underground connection. Customer accounts may be residential or commercial accounts. Examples of residential accounts include but are not limited to a house 130a, 130b, or an apartment in an apartment complex 135. Commercial accounts may be an office building 140a or an apartment complex 140b (e.g., an owner offers cable services to apartment renters).

A service operator network comprises network elements including but not limited to customer access network ticketing system 105, outside plant (OSP) ticketing system 110, telemetry system 160, leakage management system 165, task-specific global positioning system (GPS)-enabled network fault annunciator 175, as well as access to the Public Switched Telephone Network (PSTN) 170 and the Internet 115. In addition, the service operator network includes computing devices 185 and 190 used by technicians in the field.

Customer access network ticketing system 105 manages faults associated with customer access networks 125. In an embodiment, a customer access network fault includes but is not limited to at least one of a failure associated with at least one of: a tap (e.g., tap 107a-107d), a wire, a ground block, a cable modem, a set top box, a digital video recorder (DVR), a router, an optical network terminal, or an optical network unit. For example, customer access network ticketing system 105 electronically receives notifications of a customer access network fault from at least one of: telemetry system 160, leakage measurement system 165, or computing devices 185 or 190. Customer access network ticketing system 105 enters the fault information, creates a ticket which becomes a pending ticket, and then assigns the pending ticket to a technician, thus the pending ticket becomes an assigned ticket.

The technician may repair the fault, or return the ticket unresolved (e.g., when the technician cannot resolve the problem). The technician may be, for example, a field service technician that works on customer access network related faults. The technician electronically transmits a notification via a computing device to customer access network ticketing system 105 that the fault is repaired or unresolved. Customer access network ticketing system 105 receives a notice that the fault is repaired and closes the assigned ticket. Alternatively, customer access network ticketing system 105 receives a notice that the fault is unresolved and escalates the assigned ticket (e.g., assigns the ticket to a more experienced technician).

Outside plant (OSP) ticketing system 110 manages faults associated with outside plant (OSP) 145. An OSP fault includes but is not limited to: a failure associated with at least one of: a node, a repeater, a cable, a pole-to-pole connection, an optical line terminal, or a passive optical network. For example, OSP ticketing system 110 electronically receives notifications of OSP faults from at least one of: telemetry system 160, leakage measurement system 165, or computing devices 185 or 190. OSP ticketing system 110 enters the fault information, creates a ticket which becomes a pending ticket, and then assigns the pending ticket to a technician, thus the pending ticket becomes an assigned ticket.

The technician may repair the fault, or return the ticket unresolved (e.g., when the technician cannot resolve the problem). The technician may be, for example, an OSP technician that works on OSP related faults. The technician electronically transmits a notification via a computing device to OSP ticketing system 110 that the fault is repaired or unresolved. OSP ticketing system 110 receives a notice that the fault is repaired and closes the assigned ticket. Alternatively, OSP ticketing system 110 receives a notice that the fault is unresolved and escalates the assigned ticket (e.g., assign the ticket to a more experienced technician).

Telemetry system 160 may collect, store, and/or analyze measurements including physical level measurements such as received power levels and signal to noise ratios, to detect faults in OSP 145 and/or customer access network 125. For example, telemetry system 160 may collect, store, and analyze data from elements in OSP 145 (e.g., node 180, a trunk amplifier 182, a bridge amplifier 184, a repeater, a line extender amplifier 186) and detect a fault; telemetry system 160 may electronically transmit a notification accordingly to OSP ticketing system 110, and/or task-specific GPS-enabled network fault annunciator 175. In another example, telemetry system 160 may collect, store, and analyze data from customer access network 125 (e.g., from at least one of a cable modem in house 130a, or tap 107a) to detect a fault. Telemetry system 160 may then electronically transmit a notification to customer access network ticketing system 105 and/or task-specific GPS-enabled network fault annunciator 175. In an example, a technician in the field may use a computing device 185 or 190 to electronically receive measurements to determine a fault and electronically transmit the corresponding fault information to at least one of: telemetry system 160, customer access network ticketing system 105, OSP ticketing system 110, or task-specific GPS-enabled network fault annunciator 175. For example, a technician in the field may use a computing device 185 or 190 to electronically receive measurements from node 180 to determine a fault (e.g., an OSP fault) and electronically transmit the corresponding node 180 fault information to at least one of: telemetry system 160, OSP ticketing system 110, or task-specific GPS-enabled network fault annunciator 175.

Leakage measurement system 165 may also detect faults from OSP 145 and/or customer access network 125. For example, leakage measurement system 165 may detect and store at least one fault associated with OSP 145 (e.g., a fault in at least one of node 180, a trunk amplifier 182, a bridge amplifier 184, a repeater, or a line extender amplifier 186) or customer access network 125 (e.g., a fault in a tap 107), and electronically transmit a notification accordingly to at least one of: OSP ticketing system 110, customer access network ticketing system 105, and/or task-specific GPS-enabled network fault annunciator 175. For example, when node 180 incurs a fault, node 180 may electronically transmit a node 180 fault alert to leakage measurement system 165. Leakage measurement system 165 may electronically transmit a notification accordingly to OSP ticketing system 110 and/or task-specific GPS-enabled network fault annunciator 175. In an example, a technician in the field in proximity to node 180 may have computing device 185 or 190 that receives the node 180 fault alert (e.g., an OSP fault alert) and electronically transmits the corresponding node 180 fault information to at least one of: leakage measurement system 165, OSP ticketing system 110, or task-specific GPS-enabled network fault annunciator 175.

Computing device 185 or 190 is a mobile computing device used by technicians in the field to electronically transmit fault notifications to customer access network ticketing system 105, OSP system 110, and/or task-specific GPS-enabled network fault annunciator 175. For example, when a technician determines an OSP fault, the technician may send a notification to OSP system 110 and/or task-specific GPS-enabled network fault annunciator 175 via computing device 185 and/or 190. Likewise, when a technician determines a customer access fault, the technician may send a notification to customer access network ticketing system 105, and/or task-specific GPS-enabled network fault annunciator 175 via computing device 185 and/or 190.

In an example, computing device 185 and/or 190 may receive a fault alert from a network element (e.g., node 180 or tap 107) and electronically transmit an associated notification to at least one of: a respective ticketing system (105/110) depending on the type of fault, leakage measurement system 165, or task-specific GPS-enabled network fault annunciator 175. In another example, computing device 185 and/or 190 may receive measurements (e.g., physical level measurements) from a network element (e.g., node 180 or tap 107) and detect a fault; computing device 185 and/or 190 may electronically transmit an associated notification to at least one of: a respective ticketing system (105/110) depending on the type of fault, telemetry system 160, or task-specific GPS-enabled network fault annunciator 175.

In addition, a technician may electronically receive assigned tickets via computing device 185 and/or 190 from at least one of customer access network ticketing system 105 or OSP ticketing system 110. The assigned ticket includes fault information needed to complete the associated repair task. The technician may also electronically receive a repair task associated with a fault via computing device 185 and/or 190 from task-specific GPS-enabled network fault annunciator 175. Once the technician completes a task or determines that the task cannot be completed, the technician electronically transmits a notification to the at least one of: a respective ticketing system (105 or 110) based on the type of repair task and/or fault, or task-specific GPS-enabled network fault annunciator 175.

In an embodiment, computing device 185 or 190 may be used by a technician to query task-specific GPS-enabled network fault annunciator 175 to determine: if any of the assigned tickets allotted to them include a futile task, and therefore the technician should not expend further efforts on the assigned ticket; and determine if the technician is qualified to address any repair tasks (e.g., repair tasks associated with newly received faults or pending tickets, e.g., a newly pending ticket) in the same geographic region in which they are working. This allows the service operator to take advantage of technician resources already deployed in the geographic region of a newly received fault or a pending ticket. This may result in economic savings compared to assigning a new repair task (associated with a newly received fault or a pending ticket) to another technician in a different geographic region who then has to drive to the geographic region.

Computing device 185 or 190 may be any type of computing device, such as, for example and without limitation, a personal computer, a mobile phone, a tablet, a PDA, a workstation, an embedded system, a game console, or the like. Computing device 185 or 190 may, for example, include a web browser application that enables a user (e.g., a technician) to log into a cable management system such as a ticketing system or task-specific GPS-enabled network fault annunciator 175.

Task-specific global positioning system (GPS)-enabled network fault annunciator 175 proactively notifies a technician when a task the technician is currently assigned to address may be negatively impacted by a nearby fault (e.g., the task may be a futile work effort), and/or if the technician is qualified to repair a nearby fault. The technician is qualified if the technician has the necessary skills, parts (e.g., materials), and/or equipment (test equipment) required to repair the nearby fault. For example, task-specific GPS-enabled network fault annunciator 175 receives fault information (e.g., periodically), determines and correlates fault location information to a map, and analyzes at least one of: the fault information, the fault location information, or the map to determine whether any tasks are futile and whether technicians already deployed in a geographic region may address newly received faults or any pending tickets (e.g., faults entered into a ticketing system but not yet assigned to a technician). In addition, task-specific GPS-enabled network fault annunciator 175 may receive and respond to queries from a technician via a computing device to: determine whether any of the repair tasks associated with their assigned tickets are now futile tasks based on newly received faults; and determine whether the querying technician is qualified to address (e.g., repair) any newly received faults or pending tickets. In an embodiment task-specific GPS-enabled network fault annunciator 175 receives fault information periodically, continuously, or on request, where the time period may be settable.

Figure 2:
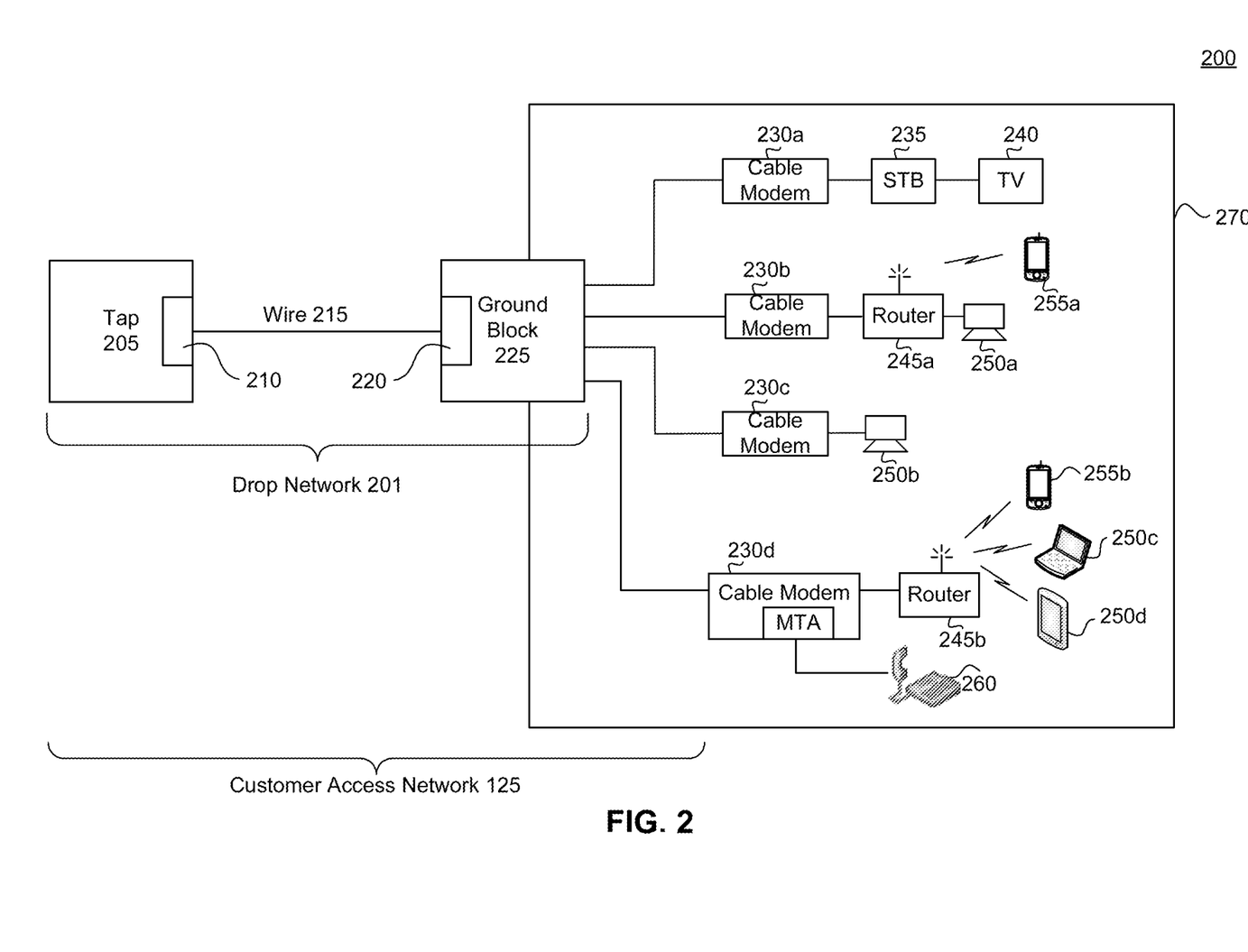
FIG. 2 illustrates a customer access network environment according to an embodiment.

FIG. 2 illustrates a customer access network environment 200 according to an embodiment. Customer access network 125 may represent a customer access network of a plurality of customer access networks. Customer access network 125 includes a drop network 201 and customer wiring that extends from drop network 201 to a customer device including but not limited to a cable modem 230. In an example, customer access network 125 may include a cable modem 230. Drop network 201 comprises five elements that may fail: tap 205 (e.g., tap 107), connection 210, wire 215, connection 220, and ground block 225. Connection 210 of tap 205 is coupled to wire 215, and wire 215 is coupled to connection 220 of ground block 225. For an aerial drop network, tap 205 may be located on a pole, and for a buried or underground drop network, tap 205 may be located on a pedestal near a curb. In an embodiment, ground block 225 is associated with drop network 201, a customer access network 125, and a customer account, where the customer account may be a residential account, or a commercial account.

One or more cable modem devices 230a, 230b, 230c and 230d associated with a customer account (e.g., customer premise 270) and customer access network 125 may be coupled to ground block 225 directly or indirectly via a distribution block (not shown). A cable modem device 230 may include but is not limited to: a data modem, a telephony cable modem, a video cable modem (e.g., a cable modem combined with a set top box (STB), a power supply cable modem, or a Wi-Fi cable modem. A cable modem device 230 may include an Ethernet interface, a universal serial bus (USB) interface, or both. Cable modem devices 230a-230d may connect to a variety of CPE devices including, but are not limited to the following: set top box (STB) 235 that may connect to television 240; routers 245a and 245b that may include a wireless and/or wired home network such as a local area network; a computing device 250b that may include but is not limited to a personal computer, a smart TV, or a laptop. Routers 245a and 245b support equipment such as computing devices 250a, 250c, 250d that may include but are not limited to personal computers, laptops, and tablets, as well as mobile cellular devices 255a and 255b. Cable modems may be integrated with components such as a STB or a Multimedia Terminal Adapter (MTA) which is a VoIP adapter. For example, standard telephones may connect to an MTA to obtain VoIP service. For example, cable modem 230d includes an MTA, and router 245b and telephone 260 connect to cable modem 230d; note that telephone 260 may be a cordless telephone.

Cable modem devices 230a-230d may respond to polls from telemetry system 160 or computing device 185 or 190 for parameter values associated with physical layer transmissions sent and received by cable modem devices 230a-230d via drop network 201. Cable modem devices 230a-230d may respond with parameter values to telemetry system 160. Based on the responses from each cable modem device 230a-230d coupled to drop network 201, a service operator network (e.g., telemetry system 160) may determine which cable modem devices 230 is having trouble. In another embodiment, devices in customer access network 125 such as ground block 225 may incur a fault and send a notification such as an alert to leakage measurement system 165. In an example, a technician in the field in proximity to ground block 225 may have computing device 185 that receives the ground block fault alert (e.g., a customer access network fault alert) and electronically transmits corresponding fault information to at least one of: leakage measurement system 165, customer access network ticketing system 105, or task-specific GPS-enabled network fault annunciator 175.

Figure 3:
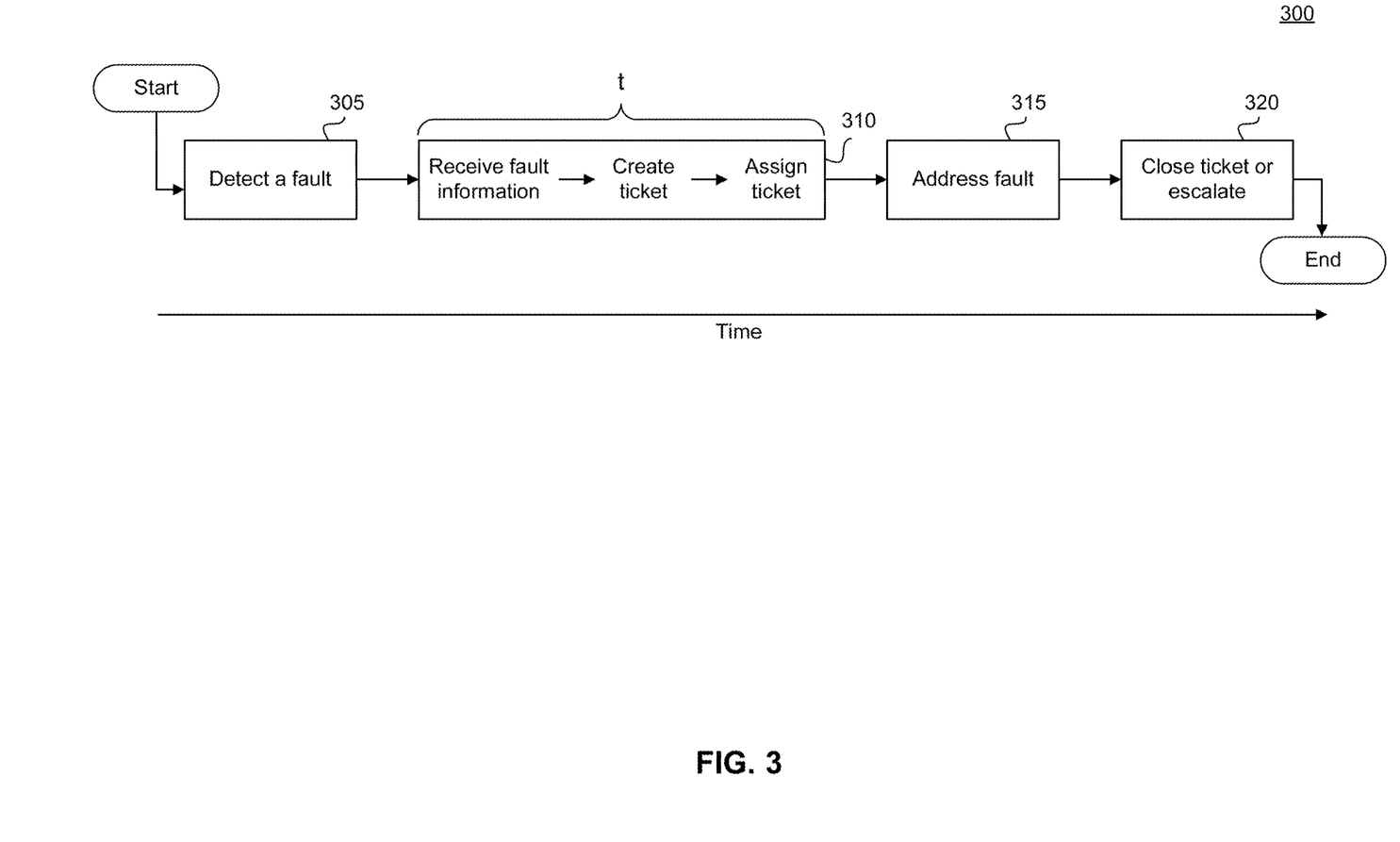
FIG. 3 illustrates a conventional flow for addressing failures.

FIG. 3 illustrates a conventional flow 300 for addressing failures. For ease of discussion, and without limitation, flow 300 will be described in terms of elements shown in FIG. 1. Flow 300 begins at step 305 where a first fault is detected. When a first fault is detected, the first fault information is sent to a ticketing system so that a ticket may be created and tracked to completion. Flow 300 continues to step 310.

At step 310, first fault information is received, a ticket is created for the task of repairing the first fault, and the ticket is assigned to a technician. The duration of step 310 is noted as the variable "t" and may take for example, 24 hours to 48 hours to complete. Flow 300 continues to step 315.

At step 315, the assigned ticket is allocated to a technician who addresses the repair task of the assigned ticket. Flow 300 continues to step 320.

At step 320, a notification is received that the task is complete or incomplete. When the task is complete, the assigned ticket is closed. When the task is incomplete, the ticket may be escalated (e.g., re-assigned to a different technician, for example, one with more skill and/or experience). Flow 300 ends.

Note that in the conventional approach, tickets created in OSP ticketing system 110 are not correlated with tickets in customer access network ticketing system 105. Further, the faults in either system are not correlated to a map and analyzed together. In addition, the conventional approach does not take advantage of qualified technicians already present in the field that may be in a position to readily address new faults.

Figure 4:
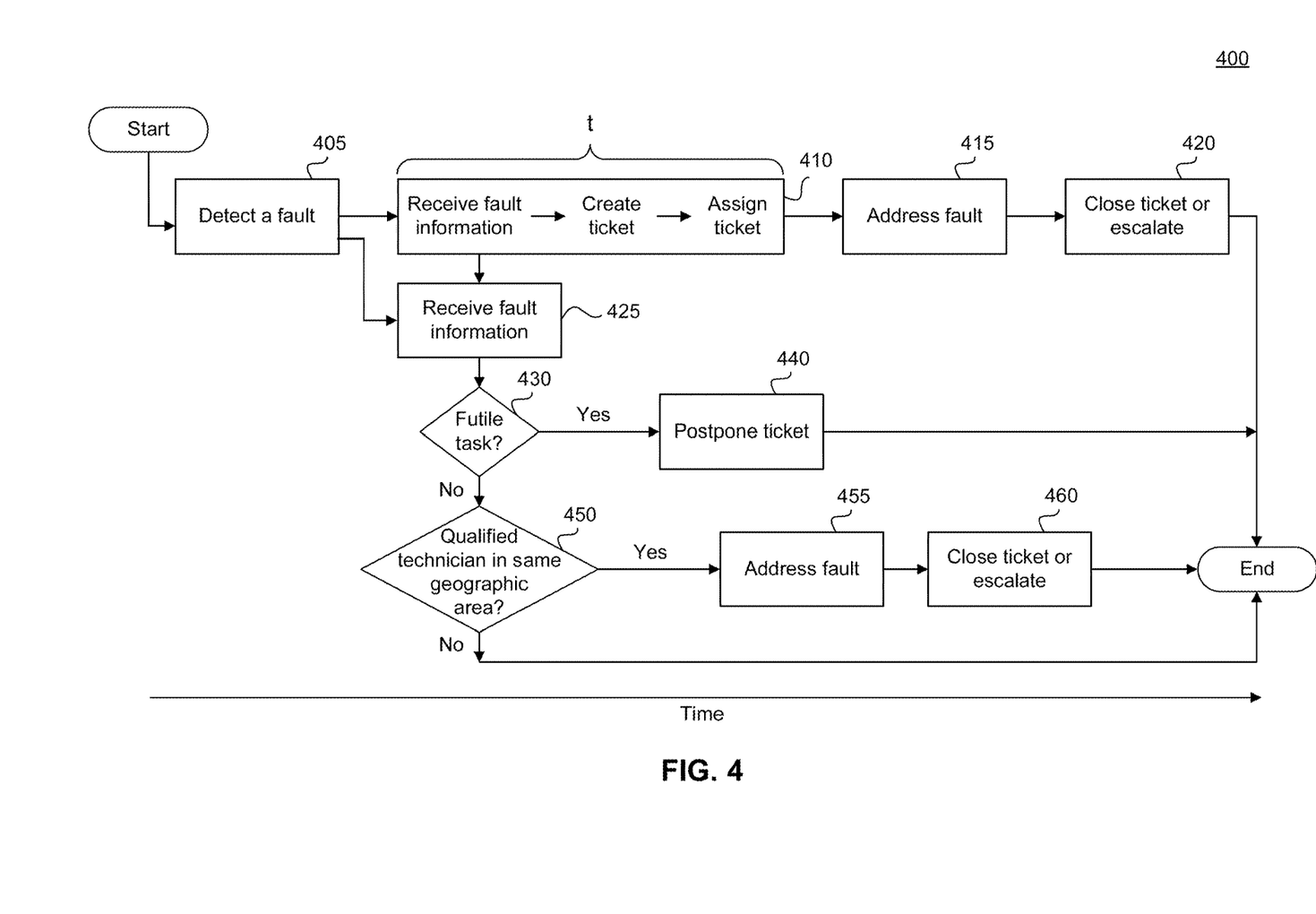
FIG. 4 illustrates a flow for reducing repair time according to an embodiment.

FIG. 4 illustrates a flow 400 for reducing repair time according to an embodiment. For ease of discussion, and without limitation, flow 400 will be described in terms of elements shown in FIG. 1. Flow 400 begins at step 405 where a first fault is detected and fault information about the first fault is electronically transmitted to a ticketing system so that a ticket may be created and tracked to completion. In an embodiment, the first fault information may also be electronically transmitted to task-specific GPS-enabled network fault annunciator 175. For example, at least one of: telemetry system 160, leakage measurement system 165, or computing device 185, detects the first fault and electronically transmits first fault information to at least one of: customer access network ticketing system 105, OSP ticketing system 110, or task-specific GPS-enabled network fault annunciator 175. Flow 400 continues to step 410 and to step 425 at substantially the same time.

At step 410, first fault information is received, a ticket is created for the task of repairing the first fault, and the pending ticket is assigned to a technician. The duration of step 410 is noted as the variable "t" and may take for example, 24 hours to 48 hours to complete. The following systems may perform the functions of step 410: customer access network ticketing system 105 for customer access network 125 related faults, and OSP ticketing system 110 for OSP 145 related faults. Flow 400 proceeds to step 415.

At step 415, the assigned ticket is allocated to a technician who addresses the repair task of the assigned ticket. For example, computing device 190 may electronically receive the assigned ticket and the technician associated with computing device 190 completes the repair task identified in the assigned ticket. After the fault is repaired, the technician electronically transmits a ticket completion notification to a respective ticketing system via computing device 190. Alternatively, if the first fault is not repaired (e.g., the technician could not determine the source of the fault to make the repair) the technician may indicate in the notification that the assigned ticket is incomplete. Flow 400 proceeds to step 420.

At step 420, a notification is received that the repair task of the assigned ticket is complete or incomplete. When the task is complete, the assigned ticket is closed. When the task is incomplete, the ticket may be escalated (e.g., re-assigned to a different technician, for example, one with more skill and/or experience). The following systems may perform the functions of step 420: customer access network ticketing system 105 for customer access network 125 related faults and OSP ticketing system 110 for OSP 145 related faults. Flow 400 ends.

Returning to step 425, the first fault information is received by task-specific GPS-enabled network fault annunciator 175 from at least one of: telemetry system 160, leakage measurement system 165, computing device 185, customer access network ticketing system 105, or OSP ticketing system 110 (e.g., from at least one of step 405 or step 410). Task-specific GPS-enabled network fault annunciator 175 determines and correlates the location information of the first fault to a map. The location information may be based on global positioning system (GPS) or any navigation system that identifies at least the latitude and longitude of a fault location. In addition, task-specific GPS-enabled network fault annunciator 175 analyzes the first fault information and first fault location information with the locations and information of other faults (e.g., newly reported faults, previously reported which may include faults identified in pending tickets, and faults identified assigned tickets). Flow 400 proceeds to step 430.

At step 430, task-specific GPS-enabled network fault annunciator 175 determines if futile tasks exist. A futile task is a repair task associated with a first fault that may not be solved or repaired by a technician because the first fault may be due to a second fault that may be upstream or larger in scope. The repair of the second fault may resolve the first fault. When the first fault is associated with a futile task, task-specific GPS-enabled network fault annunciator 175 electronically transmits notifications to respective ticketing systems and/or computing device 190 to postpone work efforts associated with the futile task. Identifying and postponing futile work efforts may result in significant savings in time, materials, and labor repair efforts. For example, if a technician is assigned to repair a first fault associated with pole 106a and a second fault associated with node 180 exists, the task of repairing the pole 106a fault may be a futile task because the problem is due to node 180 upstream. The efforts to repair the fault associated with pole 106a should be postponed to save on at least one of: parts, equipment, or labor. Further, if the repair efforts associated with pole 106a were to continue, the repair efforts would likely be unresolved, escalated, and then eventually closed. When a futile task is determined, flow 400 proceeds to step 440. When a futile task is not determined, flow 400 proceeds to step 450. For example, when a futile task is determined and is associated with at least one of: a recently received fault not yet entered in a ticketing system, a pending ticket, or an assigned ticket, task-specific GPS-enabled network fault annunciator 175 electronically transmits a notification to the respective ticketing system to postpone work efforts associated with the futile task. When the futile task is associated with an assigned ticket, task-specific GPS-enabled network fault annunciator 175 may electronically transmit a notification to computing device 190 associated with the technician addressing the assigned ticket to postpone the work effort. Flow 400 proceeds to step 440.

At step 440, the respective ticketing system (e.g., customer access network ticketing system 105 for customer access network faults, or OSP ticketing system 110 for OSP faults) postpones any pending or assigned ticket associated with a futile task, or no new ticket is entered for a recently received fault associated with a futile task. Note that a fault that is associated with a futile task may be postponed substantially sooner than a fault that follows the conventional path of flow 300 is closed, and possibly even before time t ends (e.g., before the pending ticket is assigned to a technician). Flow 400 ends.

Returning to step 450, if any qualified technicians already in the field are able to address recently received faults (e.g., the first fault) or repair tasks associated with pending tickets, flow 400 proceeds to step 455. Otherwise, flow 400 ends. For example, task-specific GPS-enabled network fault annunciator 175 determines whether the first fault or a pending ticket in a geographic region may be addressed by a qualified technician already working in the same geographic region. A technician may be a qualified technician if he/she has the necessary skills (e.g., certifications, training, abilities, experience), materials (e.g., parts and supplies), and/or equipment (e.g., test equipment) to rectify the first fault (e.g., complete the repair task of the first fault) or the fault associated with a pending ticket. When a qualified technician is identified, task-specific GPS-enabled network fault annunciator 175 electronically transmits notifications to computing device 190 of the qualified technician to complete the repair task of the first fault or the pending ticket. Note that the qualified technician or the not-qualified technician may be the same technician as identified in step 430, or a different technician. In addition, a notification may be electronically transmitted to a respective ticketing system indicating at least one of: that the first fault is being addressed by the qualified technician and a ticket created for the first fault should be assigned accordingly to the qualified technician; or that a pending ticket is being addressed by the qualified technician, and the pending ticket should therefore be assigned to the qualified technician. Flow 400 proceeds to step 455.

At step 455, the qualified technician may receive a notification of the repair task associated with the first fault and/or a pending ticket via computing device 190, and begin repairs. Note that the qualified technician may receive the notification to begin addressing the first fault significantly sooner than in step 315 of the conventional flow 300, and potentially before the time period t has ended (e.g., before a ticket of the first fault or the pending ticket is assigned). Thus, the system may take advantage of technicians already deployed in the field to address repairs in a more timely fashion. When the repair task is complete, the qualified technician may send a notification via computing device 190 to the respective ticketing system that the repair task is complete. Alternatively, if the repair task is not corrected (e.g., the technician could not determine the source of the first fault or the fault of the pending ticket to make the repair) the technician may indicate in the notification that the repair task is incomplete. Flow 400 continues to step 460.

At step 460, the respective ticketing system receives the notification regarding the repair task. When the repair is complete, the respective ticketing system closes the ticket. When the repair is incomplete, the respective ticketing system may escalate the ticket (e.g., assign to a more experienced technician). Flow 400 ends.

Flow 400 may be periodic. In an embodiment, a task-specific GPS-enabled network fault annunciator may electronically obtain fault information periodically, and the corresponding periodic time interval is settable.

Figure 5A:
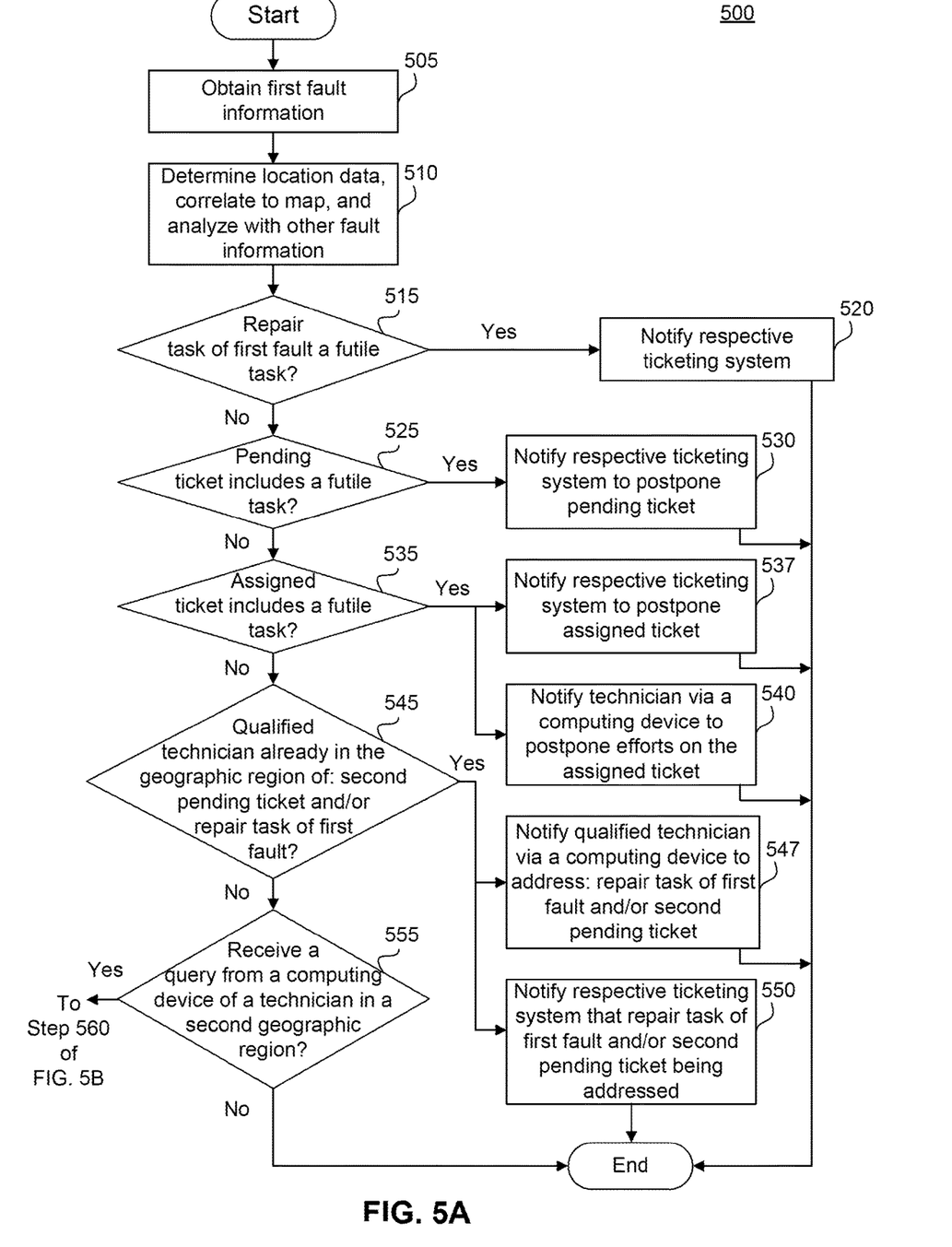
FIG. 5A illustrates a method for reducing repair time according to an embodiment.

FIG. 5A illustrates a method 500 for reducing repair time according to an embodiment. For ease of discussion, and without limitation, method 500 is described in terms of elements shown in FIG. 1. In one example, task-specific GPS-enabled network fault annunciator 175 may be used to perform method 500.

Method 500 begins at step 505 where information about one or more faults is obtained from at least one of: a telemetry system, a leakage measurement system, a computing device, a customer access network ticketing system, or a OSP ticketing system. For ease of discussion and not a limitation, a first fault of the one or more faults is referenced below. Flow 500 proceeds to step 510. The first fault information includes but is not limited to at least one of: a fault description, a network element ID, a geographic region ID, a location information, a customer premise equipment ID, a customer account ID, a reporting technician ID, a reporting system ID, a ticket number, a date, or a time. Method 500 proceeds to step 510.

At step 510, location information for the first fault information is determined and correlated to a map of the service operator's service area. The location information and first fault information (e.g., associated with the detected first fault) are analyzed in conjunction with any other fault information (e.g., associated with previously detected faults) and their corresponding locations to determine if any futile tasks exist. Note that customer access network ticketing system 105 and OSP ticketing system 110 track different types of faults in the cable network. In conventional flow 300 the respective faults, tickets, and progressions thereof are not correlated between ticketing systems 105 and 110. Further, conventional flow 300 does not determine or correlate location information of faults, does not perform analysis to determine futile work efforts, nor take advantage of technicians already deployed in a geographic region. Method 500 proceeds to step 515.

At step 515, a determination is made whether the repair task associated with the first fault information is a futile task. For example, a network fault with pole 106b may be a pending ticket or assigned ticket in OSP ticketing system 110. The repair task associated with the first fault information may be associated with office building 140a. In this example, creating and assigning a ticket to repair the customer access network 125 fault for office building 140a may be a futile task since the pending or assigned ticket to repair pole 106b is larger in scope and may be the true source of the problem rather than a problem in customer access network 125. When the repair task associated with the first fault information is a futile task, method 500 proceeds to step 520. When the repair task associated with the first fault information is not a futile task, method 500 proceeds to step 525.

At step 520, When the repair task associated with the first fault is a futile task, task-specific GPS-enabled network fault annunciator 175 electronically transmits a notification to customer access network ticketing system 105 or OSP ticketing system 110 indicating that a ticket corresponding to the first fault should be postponed. Method 500 ends.

Returning to step 525, a determination is made whether a pending ticket in a ticketing system (e.g., customer access network ticketing system 105 or OSP ticketing system 110) is associated with or includes a futile task and thus, the pending ticket should be postponed. For example, a pending ticket (e.g., in customer access network ticketing system 105) to address a fault in customer access network 125 (e.g., associated with office building 140a) is not yet assigned to a technician. The first fault information may indicate that a fault exists with pole 106b, thus, a determination is made that the pending ticket to address the fault in customer access network 125 with office building 140a may be a futile task because the problem may be due to the fault with pole 106b rather than a problem in customer access network 125.

When the pending ticket includes a futile task, method 500 proceeds to step 530. When the pending ticket does not include or is not associated with a futile task, method 500 proceeds to step 535.

At step 530, when the pending ticket includes a futile task, the task-specific GPS-enabled network fault annunciator 175 electronically transmits a notification to the respective system that the task to repair the fault associated with the pending ticket is a futile task and thus the pending ticket should be postponed. The task-specific GPS-enabled network fault annunciator 175 may track the progress or status of the upstream problem and one or more associated futile tasks. Once the upstream problem (e.g., the fault with pole 106b) has been cleared, the task-specific GPS-enabled network fault annunciator 175 may transmit a notification to a respective system that a postponed ticket may be reinstated (e.g., a postponed ticket may become a pending ticket so the fault in customer access network 125 may be addressed). Method 500 ends.

Returning to step 535, a determination is made whether an assigned ticket in a system (e.g., customer access network ticketing system 105 or OSP ticketing system 110) is associated with or includes a futile task, and thus the assigned ticket should be postponed. When the assigned ticket is associated with a futile task, method 500 proceeds to steps 537 and 540 at substantially the same time. When an assigned ticket is not associated with a futile task, method 500 proceeds to step 545.

At step 537, task-specific GPS-enabled network fault annunciator 175 electronically transmits a notification to the respective ticketing system (e.g., 105 or 110) to postpone the assigned ticket associated with the futile task. Method 500 ends.

At step 540, task-specific GPS-enabled network fault annunciator 175 electronically transmits a notification to the technician working the assigned ticket associated with the futile task via computing device 190, to postpone efforts to complete the futile task. Method 500 ends.

Returning to step 545, a determination is made whether a qualified technician is already in the area of the first fault (or a second pending ticket) so that the qualified technician may repair the first fault (or address the second pending ticket) in a timely fashion compared to waiting for the completion time t, of step 310 which may take from 24 hours to 48 hours to assign a respective ticket. Further, the assigned ticket of step 310 may be allocated to a technician in a different geographic region than the first fault (or the second pending ticket), thus, additional time and costs are incurred to travel to the geographic region. For example, a technician associated with computing device 190 is working on an assigned ticket to repair a fault with pole 106b, and the first fault information (or the fault information of the second pending ticket) received by task-specific GPS-enabled network fault annunciator 175 indicates a fault with pole 106a in the same geographic region as pole 106b. Task-specific GPS-enabled network fault annunciator 175 may determine that the technician working on pole 106b is qualified to address the repair task of pole 106a by analyzing the skills, materials, and equipment necessary to complete the pole 106a repair task, with technician's skill set, access to materials or parts, as well as access to equipment such as test equipment. Access to materials or equipment may include determining contents of the technician's vehicle and/or the technician's proximity to a warehouse. When the technician already in the same geographic region is qualified to address the first fault (or the second pending ticket), method 500 proceeds to proceeds to steps 547 and 550 at substantially the same time. When the technician is not qualified to address the first fault (or the second pending ticket), method 500 proceeds to step 555. Note that the qualified technician or the not-qualified technician may be the same technician as described in step 540, or a different technician.

At step 547, task-specific GPS-enabled network fault annunciator 175 electronically transmits a notification to the qualified technician via computing device 190 to address the first fault (or the second pending ticket). In an embodiment, the qualified technician may send a notification to task-specific GPS-enabled network fault annunciator 175 after the first fault (or the second pending ticket) is addressed. Method 500 ends.

At step 550, task-specific GPS-enabled network fault annunciator 175 electronically transmits a notification to the respective ticketing system of the first fault (or of the second pending ticket) is already being addressed and should be assigned to the qualified technician. This prevents the respective system (e.g., OSP ticketing system 110) from assigning a ticket to address the first fault received in step 410 or the second pending ticket. Method 500 ends.

Returning to step 555, a determination is made whether task-specific GPS-enabled network fault annunciator 175 receives a query from a technician to determine whether any newly received faults have been received such that any of his/her assigned tickets now include any futile tasks, or if the technician is qualified to address any newly received faults in the geographic region of the technician. For example, the technician's query may occur after step 425 of flow 400, but before the periodic time interval of flow 400 begins again. When a query has been received the technician via a computing device, method 500 proceeds to step 560 of FIG. 5B. When a query has not been received, method 500 ends.

Figure 5B:
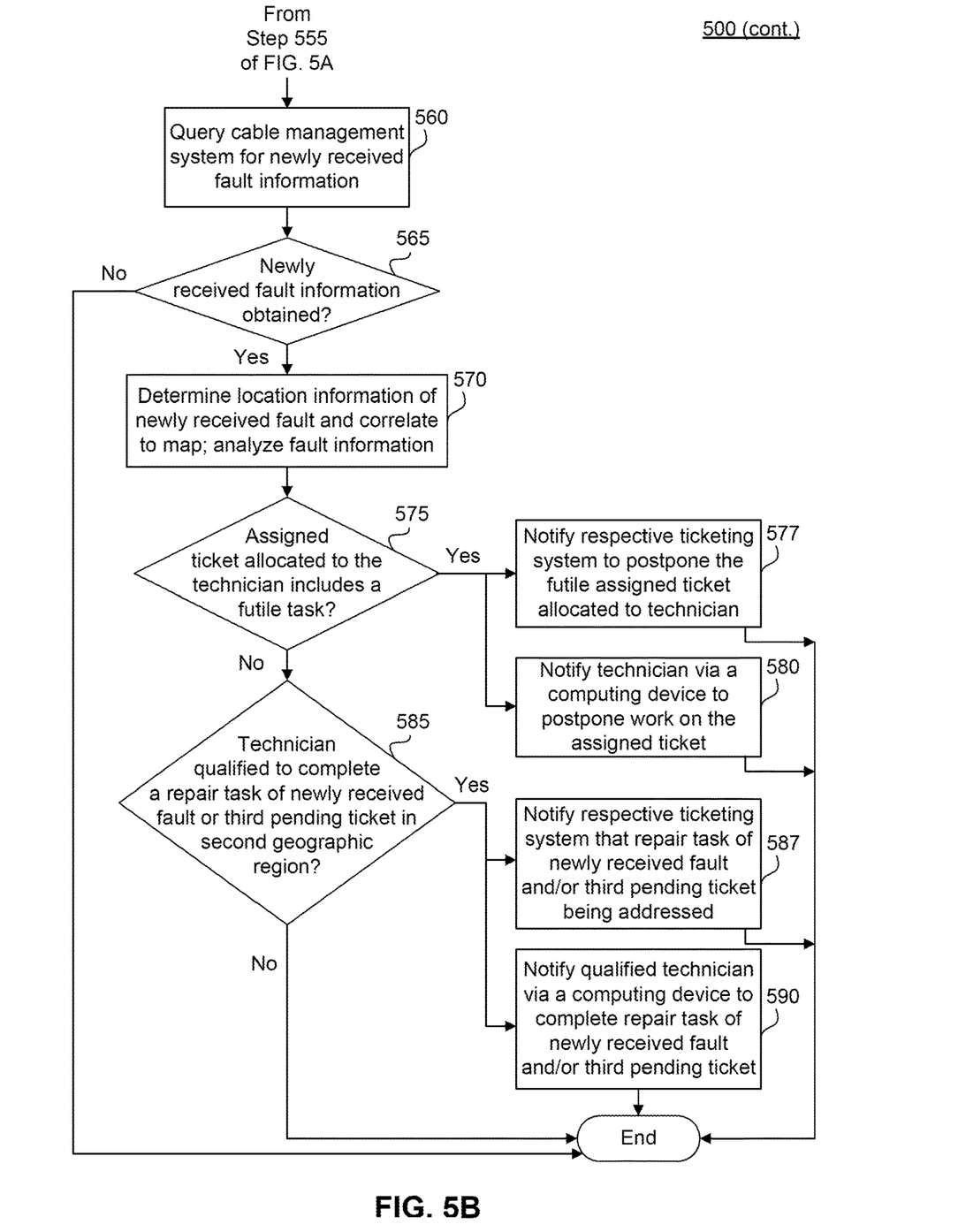
FIG. 5B illustrates the continued method for reducing repair time according to an embodiment.

FIG. 5B illustrates the continued method 500 for reducing repair time according to an embodiment. Method 500 continues at step 560. At step 560, task-specific GPS-enabled network fault annunciator 175 queries a cable management system for any newly received fault information. A cable management system may include at least one of: a telemetry system, a leakage measurement system, a computing device, a customer access network ticketing system, or an OSP ticketing system. Method 500 proceeds to step 565.

At step 565 a determination is made whether any newly received fault and corresponding newly received fault information is obtained. When newly received fault information is received, method 500 proceeds to step 570. When newly received fault information is not received or obtained, method 500 ends.

At step 570, task-specific GPS-enabled network fault annunciator 175 determines and correlates the location information for the newly received fault to the map. In addition, the newly received fault information is analyzed with the existing fault information correlated to the map (e.g., including faults associated with pending and assigned tickets). Method 500 proceeds to step 575.

At step 575, a determination is made whether any of the technician's assigned tickets are now associated with futile tasks. When an assigned ticket is associated with a futile task, method 500 proceeds to steps 577 and 580 at substantially the same time. When an assigned ticket is not associated with a futile task, method 500 proceeds to step 585.

At step 577, task-specific GPS-enabled network fault annunciator 175 electronically transmits a notification to the respective ticketing system to postpone the assigned ticket allocated to the technician via a computing device. Method 500 ends.

At step 580, task-specific GPS-enabled network fault annunciator 175 electronically transmits a notification to the technician via a computing device to postpone work efforts on the assigned ticket. Method 500 ends.

Returning to step 585, a determination is made whether the technician is qualified to complete a repair task associated with a newly received fault (or a repair task associated with a third pending ticket) in a ticketing system. When the technician is qualified to complete the repair task, method 500 proceeds to steps 587 and 590 at substantially the same time. When the technician is not qualified to complete the repair task, method 500 ends.

At step 587, task-specific GPS-enabled network fault annunciator 175 electronically transmits a notification to the respective ticketing system that the repair task associated with the newly received fault (or the third pending ticket) is being addressed. Method 500 ends.

At step 590, task-specific GPS-enabled network fault annunciator 175 electronically transmits a notification to the qualified technician via a computing device to complete the repair task associated with the newly received fault (or the third pending ticket). In an embodiment, the qualified technician may send a notification to task-specific GPS-enabled network fault annunciator 175 after the newly received fault (or the third pending ticket) is addressed. Method 500 ends.

Figure 6:
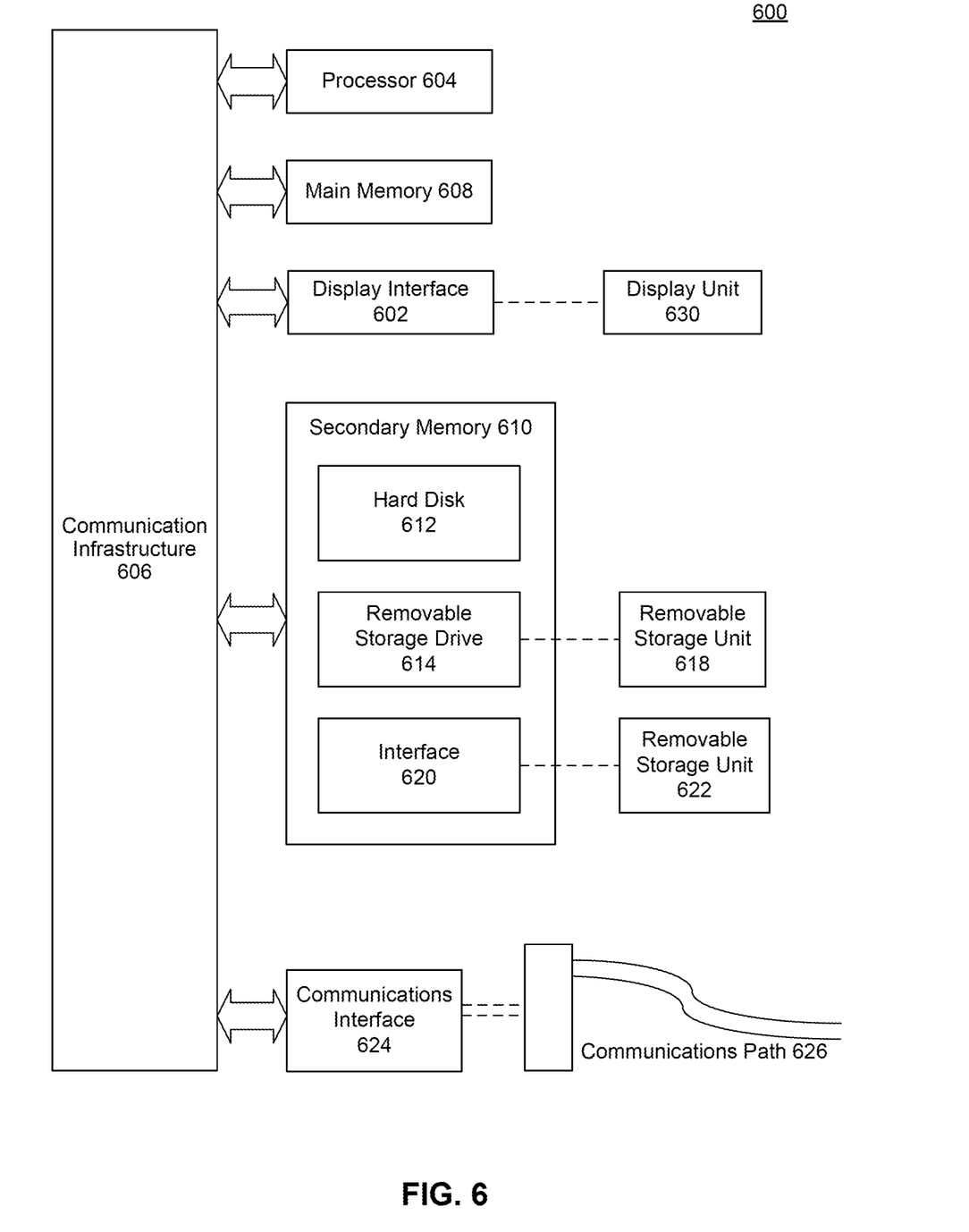
FIG. 6 illustrates an example computer system which can be used to implement an embodiment.

Various aspects of the disclosure can be implemented by software, firmware, hardware, or a combination thereof. FIG. 6 illustrates an example computer system 600 in which some embodiments, or portions thereof, can be implemented as computer-readable code. Various embodiments are described in terms of the example computer system 600. After reading this description, it will become apparent to a person skilled in the relevant art how to implement the embodiments using other computer systems and/or computer architectures.

Computer system 600 includes one or more processors, such as processor 604. Processor 604 may comprise suitable logic, circuitry, dedicated circuits, and/or code that may enable processing data and/or controlling operations of computer system 600. Processor 604 can be a special purpose or a general purpose processor. Processor 604 is connected to a communication infrastructure 606 (for example, a bus or network). Processor 604 may be enabled to provide control signals to the various other portions of computer system 600 via communication infrastructure 606, for example.

Computer system 600 also includes a main memory 608, and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. that is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 that allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the embodiments as discussed herein. In particular, the computer programs, when executed, enable processor 604 to implement the disclosed processes. Accordingly, such computer programs represent controllers of the computer system 600. Where the embodiments are implemented using software, the software may be stored in a computer program product and loaded into computer system 600 using removable storage drive 614, interface 620, hard drive 612 or communications interface 624. This can be accomplished, for example, through the use of general-programming languages (such as C or C++). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any non-transitory computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the embodiments and the appended claims in any way.

The accompanying drawings, which are incorporated herein and form part of the specification, illustrate the embodiments and, together with the description, further serve to explain the principles of the embodiments and to enable a person skilled in the pertinent art to make and use the embodiments. The embodiments will be described with reference to the accompanying drawings. Generally, the drawing in which an element first appears is typically indicated by the leftmost digit(s) in the corresponding reference number.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concepts of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system, comprising:
   a ticketing system;
   a memory; and
   one or more processors coupled to the memory, configured to:
   electronically obtain a first fault location of a first task of an assigned ticket;
   determine based at least on the first fault location and a first upstream task that the first task is a first futile task, wherein repair of the first upstream task may resolve the first futile task;
   electronically transmit a notification to the ticketing system that issued the assigned ticket, to postpone the assigned ticket;
   determine that a technician qualified to repair the first upstream task is already deployed in a geographic region of the first upstream task;
   electronically transmit a notification to the technician to repair the first upstream task; and
   electronically transmit a notification to the ticketing system that the first task is being addressed.

2. The system according to claim 1, wherein the ticketing system comprises: a customer access network ticketing system or an outside plant (OSP) ticketing system.

3. The system according to claim 1, wherein the assigned ticket comprises at least one of: a fault description, a network element ID, or a geographic region ID.

4. The system according to claim 1, wherein the assigned ticket comprises at least one of: a customer premise equipment ID, a customer account ID, a reporting system ID, a ticket number, a date, or a time.

5. The system according to claim 1, wherein the one or more processors are further configured to:
   electronically receive second fault information of a second task of a second assigned ticket;
   determine based at least on the second fault information and a second upstream task that the second task is a second futile task, wherein repair of the second upstream task may resolve the second futile task;
   electronically transmit a notification to a second ticketing system that issued the second assigned ticket, to postpone the second assigned ticket;
   determine that a second technician qualified to complete the second upstream task is in a geographic region of the second upstream task;
   electronically transmit a notification to the second technician to repair the second upstream task; and
   electronically transmit a notification to the second ticketing system that the second task is being addressed.

6. The system according to claim 1, wherein first fault information comprising the first fault location is electronically obtained periodically, and a corresponding period of time is settable.

7. The system according to claim 1, wherein to determine that the technician is qualified to repair the upstream task, the one or more processors are configured to: determine that the technician has a necessary skill, access to necessary parts, and access to necessary equipment.

8. The system according to claim 1, wherein assigned ticket comprises a fault description that includes at least one of: an outside plant (OSP) fault or a customer access network fault.

9. The system according to claim 8, wherein the OSP fault comprises a failure associated with at least one of: a node, a trunk line, a trunk amplifier, a bridge amplifier, a line extender amplifier, a repeater, a cable, a pole-to-pole connection, an optical line terminal, or a passive optical network.

10. The system according to claim 8, wherein the customer access network fault comprises a failure associated with at least one of: a tap, a wire, a ground block, a router, a cable modem, a set top box, a digital video recorder (DVR), an optical network terminal, or an optical network unit.

11. A method, comprising:
    electronically obtaining a first fault location of a first task of an assigned ticket;
    determining based at least on the first fault location and a first upstream task that the first task is a first futile task, wherein repair of the first upstream task may resolve the first futile task;
    electronically transmitting a notification to a ticketing system that issued the assigned ticket, to postpone the assigned ticket;
    determining that a technician qualified to repair the first upstream task is already deployed in a geographic region of the first upstream task;
    electronically transmitting a notification to the technician to repair the first upstream task; and
    electronically transmitting a notification to the ticketing system that the first task is being addressed.

12. The method according to claim 11, wherein the ticketing system comprises: a customer access network ticketing system or an outside plant (OSP) ticketing system.

13. The method according to claim 11, wherein the assigned ticket comprises at least one of: a fault description, a network element ID, a geographic region ID, a location information, a customer premise equipment ID, a customer account ID, a reporting technician ID, a reporting system ID, a ticket number, a date, or a time.

14. The method according to claim 11, further comprising:
    electronically receiving second fault information of a second task of a second assigned ticket;
    determining based at least on the second fault information and a second upstream task that the second task is a second futile task, wherein repair of the second upstream task may resolve the second futile task;
    electronically transmitting a notification to a second ticketing system that issued the second assigned ticket, to postpone the second assigned ticket;
    determining that a second technician qualified to complete the second upstream task is in a geographic region of the second upstream task;
    electronically transmitting a notification to the second technician to repair the second upstream task; and
    electronically transmitting a notification to the second ticketing system that the second task is being addressed.

15. The method according to claim 14, wherein the determining that the second technician is qualified to complete the upstream repair task comprises: determining that the second technician has a necessary skill, access to necessary parts, and access to necessary equipment.

16. A non-transitory computer-readable medium storing instructions that, when executed by a processor of an electronic device, cause the processor to perform operations, the operations comprising:

electronically obtaining a first fault location of a first task of an assigned ticket;
determining based at least on the first fault location and a first upstream task that the first task is a first futile task, wherein repair of the first upstream task may resolve the first futile task;
electronically transmitting a notification to a ticketing system that issued the assigned ticket, to postpone the assigned ticket;
determining that a technician qualified to repair the first upstream task is already deployed in a geographic region of the first upstream task;
electronically transmitting a notification to the technician to repair the first upstream task; and
electronically transmitting a notification to the ticketing system that the first task is being addressed.

17. The non-transitory computer-readable medium of claim 16, wherein the operations further comprise:
tracking a status of the upstream task; and
determining that the upstream task has been addressed.

18. The non-transitory computer-readable medium of claim 16, wherein the operations further comprise transmitting a notification to the ticketing system to reinstate the assigned ticket that was postponed, wherein the assigned ticket includes the first futile task.

19. The non-transitory computer-readable medium of claim 16, wherein the determining that the first task is the first futile task comprises:
correlating the first fault location to a map; and
analyzing first fault information corresponding to the first fault location with upstream fault information of the first upstream task corresponding to a second fault location on the map; and
determining that repair of the first upstream task may resolve the first futile task.

20. The non-transitory computer-readable medium of claim 16, wherein the operations further comprise:
receiving a query from a second technician associated with the assigned ticket and the first futile task;
determining that the second technician is qualified to repair a second task of a pending ticket in a geographic region of the second technician; and
electronically transmitting a notification to the second technician to postpone work effort on the assigned ticket and repair the second task.

\* \* \* \* \*